US011054853B2

(12) United States Patent
Sasahara

(10) Patent No.: US 11,054,853 B2
(45) Date of Patent: Jul. 6, 2021

(54) INTEGRATED CIRCUIT DEVICE

(71) Applicants: Kabushiki Kaisha Toshiba, Tokyo (JP); Toshiba Electronic Devices & Storage Corporation, Tokyo (JP)

(72) Inventor: Shoichi Sasahara, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 148 days.

(21) Appl. No.: 16/532,605

(22) Filed: Aug. 6, 2019

(65) Prior Publication Data
US 2020/0285266 A1 Sep. 10, 2020

(30) Foreign Application Priority Data
Mar. 7, 2019 (JP) .............................. JP2019-041951

(51) Int. Cl.
*G06F 1/06* (2006.01)
*G06F 13/20* (2006.01)
*G06F 11/07* (2006.01)

(52) U.S. Cl.
CPC ............ *G06F 1/06* (2013.01); *G06F 11/0736* (2013.01); *G06F 11/0751* (2013.01); *G06F 11/0772* (2013.01); *G06F 13/20* (2013.01)

(58) Field of Classification Search
CPC .......... G06F 1/06; G06F 11/184; G06F 13/20; G06F 11/0772; G06F 11/0736; G06F 11/0739; G06F 11/26; G06F 11/1489; G06F 11/181; G06F 9/3861
See application file for complete search history.

(56) References Cited

U.S. PATENT DOCUMENTS

| 5,382,950 | A | * | 1/1995 | Gronemeyer | ........... G06F 11/16 700/78 |
| 5,577,199 | A |   | 11/1996 | Tanabe et al. | |
| 5,848,238 | A | * | 12/1998 | Shimomura | ........ G06F 11/1654 714/49 |
| 5,931,959 | A | * | 8/1999 | Kwiat | ................. G06F 11/1489 714/48 |
| 6,112,163 | A | * | 8/2000 | Oowaki | ......... G01R 31/318566 702/117 |

(Continued)

FOREIGN PATENT DOCUMENTS

JP H01-98034 A 4/1989
JP H06-342381 A 12/1994
(Continued)

*Primary Examiner* — Raymond N Phan
(74) *Attorney, Agent, or Firm* — White & Case LLP

(57) ABSTRACT

According to one embodiment, the first processing unit receives a first clock and outputs, at its first output node, data obtained by first processing of data at an input node. The second processing unit receives a first clock and outputs, at its second output node, data obtained by the first processing of the data at the input node. The third processing receives a second clock, outputs, from its third output nodes, data obtained by the first processing of the data at the input node, and outputs, from its fourth output nodes, data obtained by the first processing of the data at the input node. The determination unit outputs a first signal based on data at the fifth to eighth nodes respectively coupled to the first to fourth output nodes.

12 Claims, 7 Drawing Sheets

(56) References Cited

U.S. PATENT DOCUMENTS

| | | | | |
|---|---|---|---|---|
| 6,134,675 A * | 10/2000 | Raina | ............... | G06F 11/26 |
| | | | | 714/25 |
| 9,612,922 B2 * | 4/2017 | Geiger | ............ | G06F 11/184 |
| 2005/0246613 A1 * | 11/2005 | Blaauw | ............ | G06F 9/3861 |
| | | | | 714/763 |
| 2007/0033511 A1 * | 2/2007 | Davies | ............ | G06F 11/181 |
| | | | | 714/799 |
| 2010/0251046 A1 | 9/2010 | Mizuno et al. | | |

FOREIGN PATENT DOCUMENTS

| | | |
|---|---|---|
| JP | H08-278898 A | 10/1996 |
| JP | 5083214 B2 | 11/2012 |
| JP | 2016-80364 A | 5/2016 |

\* cited by examiner

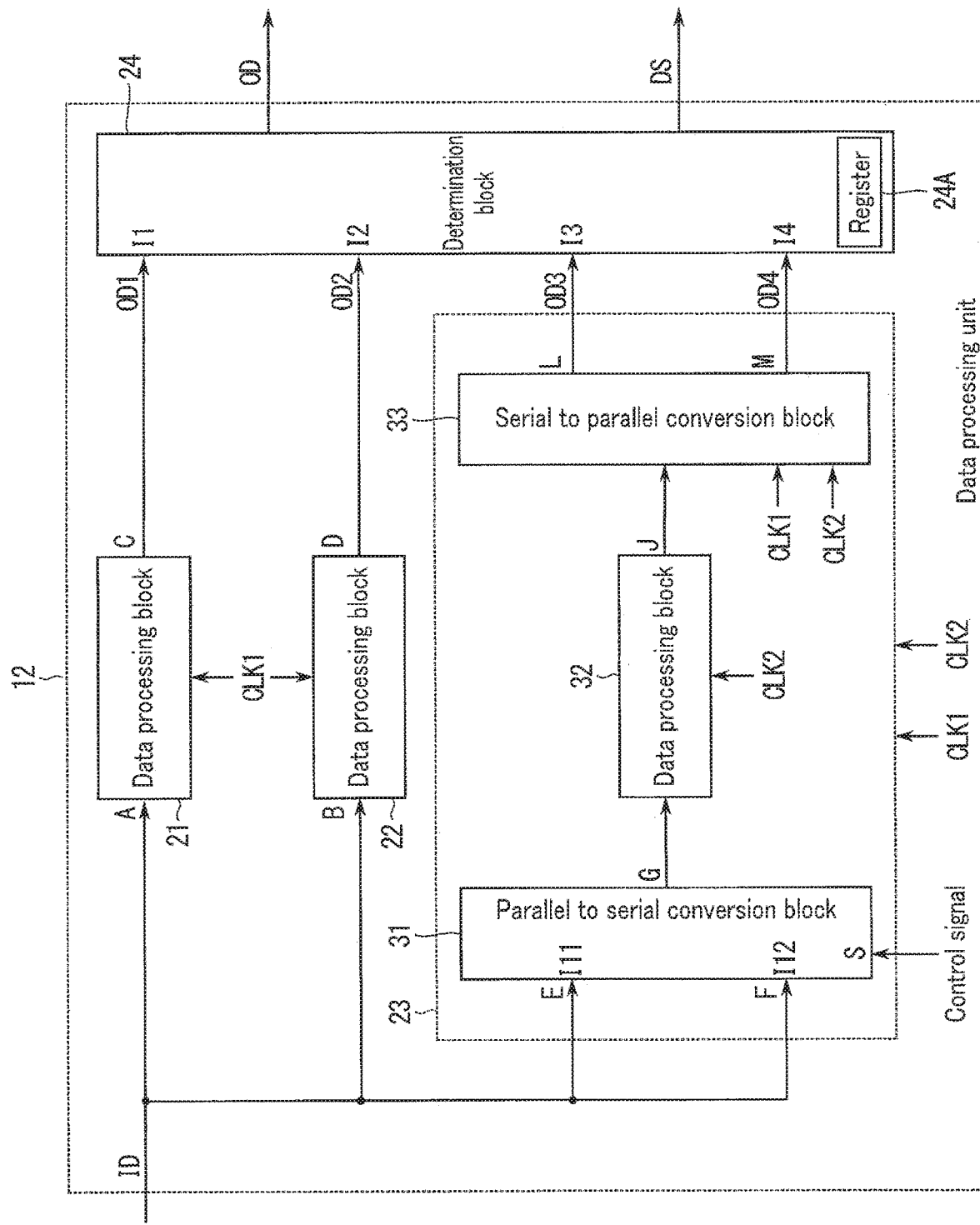
F I G. 2

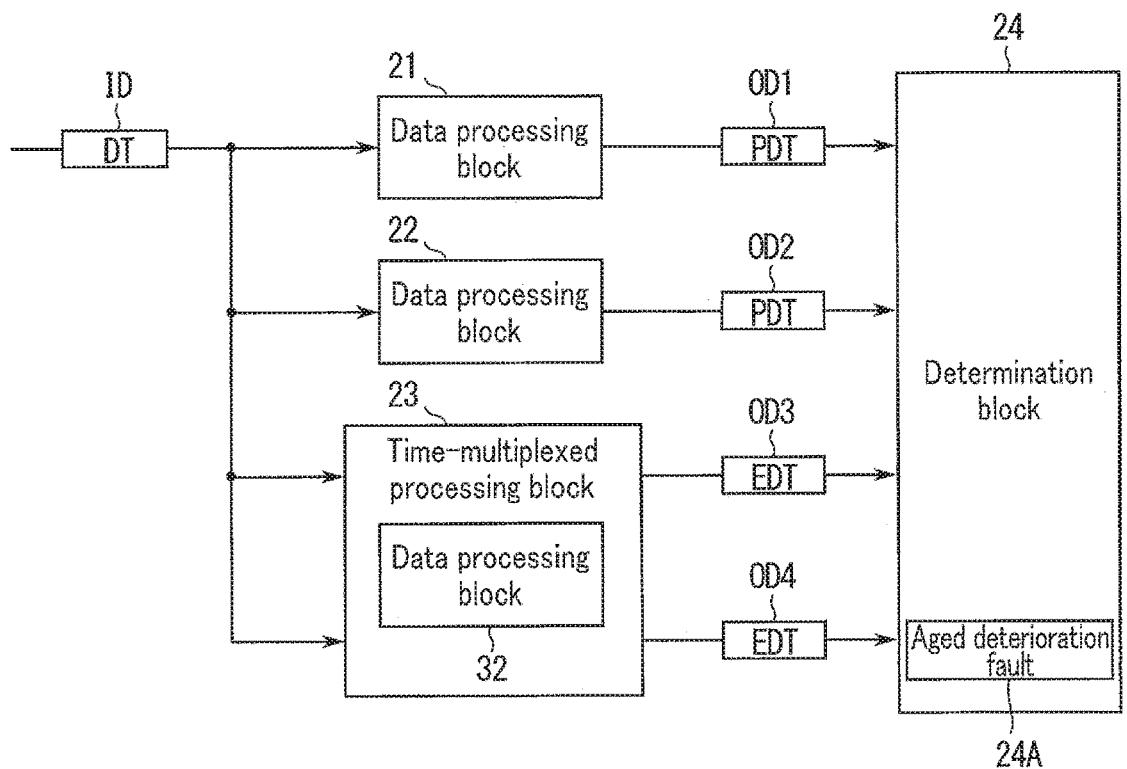
F I G. 6
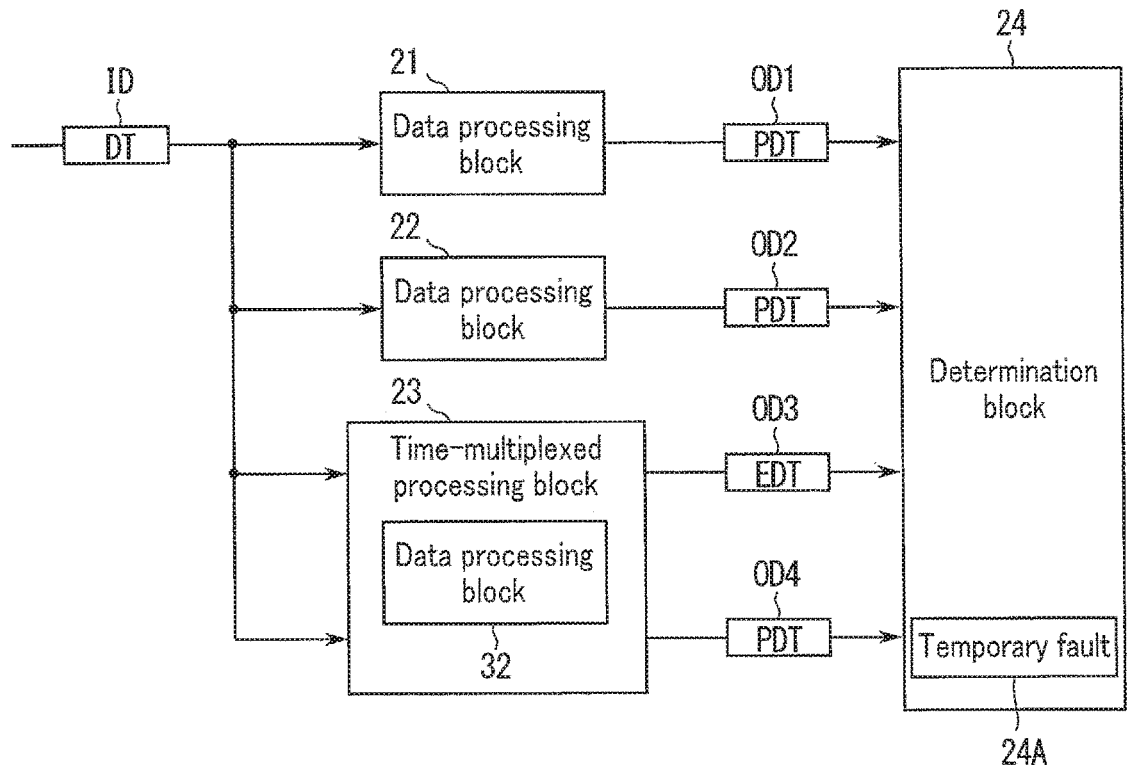
F I G. 7

US 11,054,853 B2

INTEGRATED CIRCUIT DEVICE

CROSS-REFERENCE TO RELATED APPLICATIONS

This application is based upon and claims the benefit of priority from Japanese Patent Application No. 2019-41951, filed Mar. 7, 2019, the entire contents of which are incorporated herein by reference.

FIELD

Embodiments described herein relate generally to an integrated circuit device.

BACKGROUND

An integrated circuit device which includes a functional safety mechanism is known for being used in automobiles and industrial machinery in factories, and so forth. There is a demand for an integrated circuit device of this kind to be able to detect a fault or the like in more detail.

BRIEF DESCRIPTION OF THE DRAWINGS

FIG. 2 illustrates functional blocks of a data processing unit according to the first embodiment;

FIG. 6 illustrates an example of states of data OD1 to OD4 according to the first embodiment;

FIG. 7 illustrates another example of states of data OD1 to OD4 according to the first embodiment.

DETAILED DESCRIPTION

Figure 1:
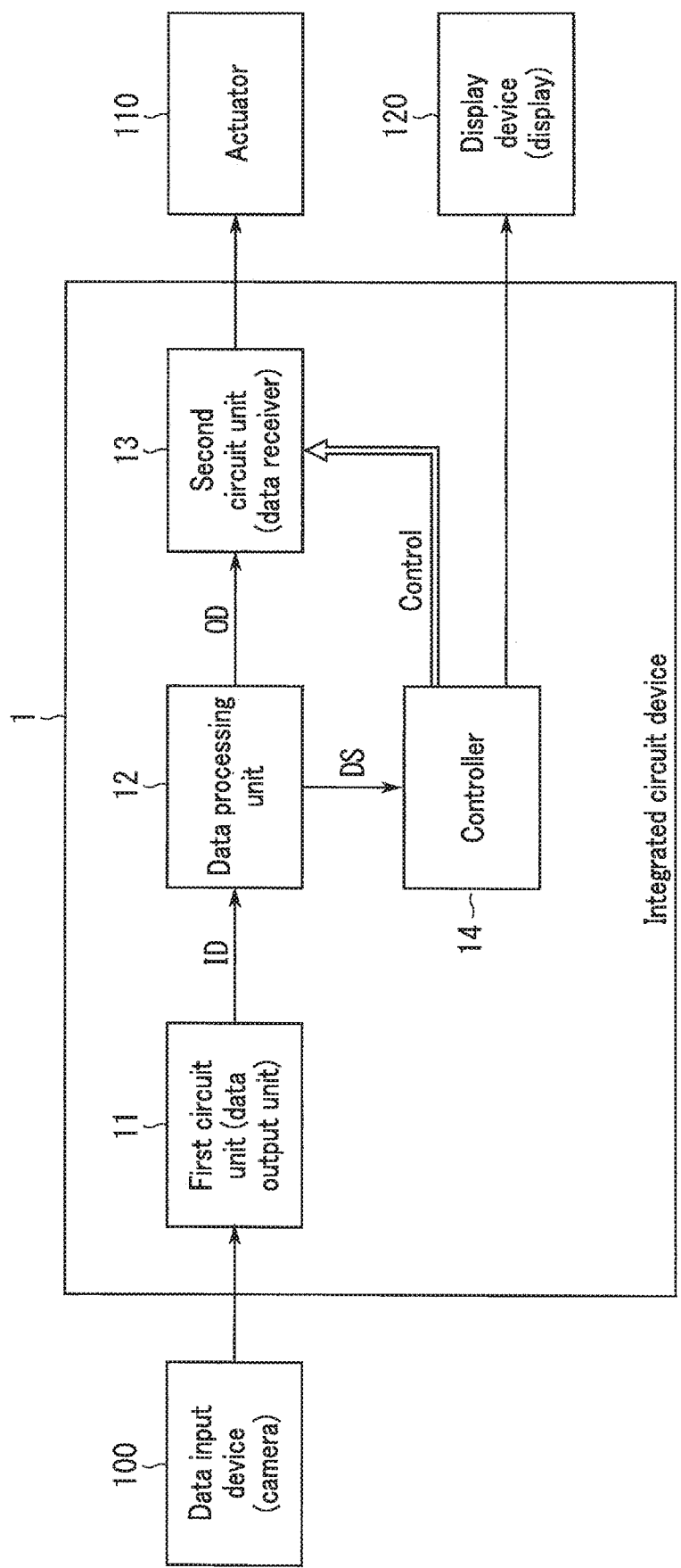
FIG. 1 illustrates functional blocks of an integrated circuit device according to a first embodiment.

In general, according to one embodiment, an integrated circuit device includes: a first processing unit; a second processing unit; a third processing unit; and a determination unit. The first processing unit receives a first clock and includes a first input node and a first output node. The first processing unit is configured to output, at the first output node, data that is obtained by first processing of data at the first input node. The second processing unit receives the first clock and includes a second input node and a second output node. The second processing unit is coupled to the first input node at the second input node and configured to output, at the second output node, data that is obtained by the first processing of data at the second input node. The third processing unit receives a second clock of a shorter cycle than a cycle of the first clock and includes a third input node, a fourth input node, a third output node, and a fourth output node. The third processing unit is coupled to the first input node at the third input node and the fourth input node, configured to output, from the third output node, data that is obtained by the first processing of data at the third input node, and configured to output, at the fourth output node, data that is obtained by the first processing of data at the fourth input node. The determination unit includes a fifth input node coupled to the first output node, a sixth input node coupled to the second output node, a seventh input node coupled to the third output node, and an eighth input node coupled to the fourth output node. The determination unit is configured to output a first signal based on data at the fifth input node, data at the sixth input node, data at the seventh input node, and data at the eighth input node.

Embodiments will now be described with reference to the figures. In the following description, components with substantially the same functionalities and configurations will be referred to with the same reference numerals, and repeated descriptions may be omitted. Each functional block can be implemented as hardware, computer software, or combination of the both. For this reason, in order to clearly illustrate that each block can be any of hardware, software or combination, descriptions will be made in terms of their functionalities in general. It is not necessary that functional blocks are distinguished as in the following examples. For example, some of the functions may be implemented by functional blocks different from those illustrated below.

Furthermore, an illustrated functional block may be divided into functional sub-blocks.

Moreover, any step in a flow of a method of an embodiment is not limited to any illustrated order, and can occur in an order different from an illustrated order and/or can occur concurrently with another step.

In the specification and the claims, a phrase of a particular first component being "coupled" to another second component includes the first component being coupled to the second component either directly or via one or more components which are always or selectively conductive.

First Embodiment

1.1. Configuration (Structure)

FIG. 1 illustrates functional blocks of an integrated circuit device 1 according to a first embodiment. The integrated circuit device 1 can be realized as a semiconductor chip, for example. As illustrated in FIG. 1, the integrated circuit device 1 includes a first circuit unit 11, a data processing unit 12, a second circuit unit 13, and a controller 14.

Any combination of the first circuit unit 11 and second circuit unit 13 is possible.

That is, the first circuit unit 11 and second circuit unit 13 can include any functions and can have any types of functions as long as data ID output from the first circuit unit 11 is processed by the data processing unit 12 and data OD output from the data processing unit 12 is received by the second circuit unit 13. As an example, the first circuit unit 11 is capable of receiving image data from an external data input device (a camera, for example) 100 of the integrated circuit device 1 and of outputting the image data, the data processing unit 12 is capable of receiving the image data and of performing particular processing on the image data, and the second circuit unit 13 is capable of receiving the processed data. Based on an example in which the first circuit unit 11 outputs image data, the first circuit unit 11 can be a circuit that performs edge detection, for example.

The data processing unit 12 receives the data ID from the first circuit unit 11, performs particular processing on the received data ID, and transmits the data OD obtained by the processing to the second circuit unit 13. The processing can be any processing that is decided based on the functions of the first circuit unit 11 and the second circuit unit 13. For instance, based on the foregoing example in which the first circuit unit 11 outputs image data, the processing by the data processing unit 12 can be processing that converts the received image data to a black-and-white image (binarization).

The data processing unit 12 includes a mechanism for maintaining the safety of a function, as will be described in detail hereinbelow. The data processing unit 12 determines its own state during data processing and the existence or non-existence of an anomaly such as a fault in particular, and when an anomaly is detected, transmits a detection signal DS to the controller 14.

Upon receiving the detection signal DS, the controller 14 controls the second circuit unit 13 based on the fact that the detection signal DS has been received. Based on an example in which the first circuit unit 11 outputs image data and the data processing unit 12 performs black and white conversion, the second circuit unit 13 can be a circuit that performs object detection processing, for example. In addition, in the case of such an example, the second circuit unit 13 is capable of supplying a signal for controlling an actuator 110 to the actuator 110 external to the integrated circuit device 1, and the controller 14 is capable of transmitting a signal for indicating a control-based state to a display device (for example, an LED (light emitting diode) and/or a display) 120, which is external to the integrated circuit device 1.

<1.1.1. Data Processing Unit>

FIG. 2 illustrates functional blocks of a data processing unit according to the first embodiment. The data processing unit 12 includes a data processing block 21, a data processing block 22, a time-multiplexed processing block 23, and a determination block 24.

The data (input data) ID is received at a node A of the data processing block 21. The data processing block 21 outputs, at node C, data that is obtained by performing processing p on the input data ID. For example, the data processing block 21 is configured to enable the processing p to be performed, performs the processing p on the input data ID, and outputs, at node C, data which is obtained as a result of the processing p. The data processing block 21 receives a clock CLK1 from the outside, for example, from the controller 14, and operates in synchronization with the clock CLK1. The data that is output from the data processing block 21 is referred to hereinbelow as output data OD1.

The node C is coupled to a first input I1 of the determination block 24.

The input data ID is also received at a node B of the data processing block 22. Like the data processing block 21, the data processing block 22 outputs, at a node D, data that is obtained by performing the processing p on the input data ID. For example, the data processing block 22 is configured to enable the processing p to be performed, performs the processing p on the input data ID, and outputs, at node D, data which is obtained as a result of the processing p. The data processing block 22 receives a clock CLK1 from the outside, for example, from the controller 14, and operates in synchronization with the clock CLK1. The data that is output from the data processing block 22 is referred to hereinbelow as output data OD2. The node D is coupled to a second input I2 of the determination block 24.

The time-multiplexed processing block 23 receives the input data ID in parallel at two nodes E and F and, based on the principles of time-multiplexing, outputs, at nodes L and M respectively, data that is obtained by performing the processing p on either of the two input data ID, and data that is obtained by performing the processing p on the other input data ID.

As a specific example, the time-multiplexed processing block 23 includes a parallel to serial (PS) conversion block 31, a data processing block 32, and a serial to parallel (SP) conversion block 33.

The PS conversion block 31 has a first input I11 and a second input I12 and receives input data ID in parallel at the first input I11 and second input I12. The PS conversion block 31 receives a control signal S from the outside, for example, from the controller 14, and, based on the control signal S, serially outputs, at a node G, the input data ID which has been received at the first input I11 and the input data ID which has been received at the second input I12. Specifically, the PS conversion block 31 receives the same input data ID at the first input I11 and second input I12, and outputs, from the node G, the input data ID(ID1) received at the first input I11 and then outputs, at the node G, the input data ID(ID2) received at the second input I12.

The data processing block 32 is also coupled to the node G at the input. Like the data processing blocks 21 and 22, the data processing block 32 outputs, at a node J, data that is obtained by performing the processing p on the input data ID. For example, like the data processing blocks 21 and 22, the data processing block 32 is configured to enable the processing p to be performed, performs the processing p on the input data ID, and outputs, at the node J, data which is obtained as a result of the processing p. The data processing block 32 is configured to perform the same processing p as the data processing blocks 21 and 22. The data processing block 32 receives a clock CLK2 from the outside, from the controller 14, for example, and operates in synchronization with the clock CLK2. The clock CLK2 rises in a shorter cycle than the clock CLK1 and rises in half the cycle of the rising edge of the clock CLK1, for example. Accordingly, the data processing block 32 is capable of performing the same processing p as the data processing blocks 21 and 22, at a higher speed than the data processing blocks 21 and 22, for example, at two times the speed. The data processing block 32 outputs, at the node J, data that is obtained as a result of the processing p.

For example, upon serially receiving, at the node G, the input data ID(ID1), which have been received at the first input I11, and the input data ID(ID2), which have been received at the second input I12, the data processing block 32 outputs data OD3 which is obtained as a result of the processing p being performed on the data ID1, and then outputs data OD4 which is obtained as a result of the processing p being performed on the data ID2.

The SP conversion block 33 is coupled, at the input thereof, to the node J, converts data received at the node J to parallel data, and outputs the parallel data in parallel from a first output node L and a second output node M. The SP conversion block 33 receives clocks CLK1 and CLK2 and operates based on the clocks CLK1 and CLK2. Specifically, the SP conversion block 33 receives and holds the data OD3 and OD4 and then outputs the data OD3 and OD4 in parallel from nodes L and M, respectively.

The node L is coupled to a third input I3 of the determination block 24, and the node M is coupled to a fourth input I4 of the determination block 24. The determination block 24 compares data which is received by the first input I1, data which is received by the second input I2, data which is received by the third input I3, and data which is received by the fourth input I4, and determines the coincidence and non-coincidence of the received data. As will be described in detail, if the data processing blocks 21 and 22, and the time-multiplexed processing block 23 (data processing block 32 in particular) are in a normal state, the data OD1, OD2, OD3 and OD4 can be expected to coincide with each other. When specific two of the data OD1, OD2, OD3 and OD4 do not coincide with each other, the determination block 24 transmits a detection signal DS indicating that there is a fault (hereinafter sometimes called a fault detection signal) to the controller 14. The determination block 24 stores, in an internal register 24A, values of one or more bits which are determined based on details of coincidence and non-coincidence. Furthermore, the determination block 24 transmits one of the data OD1, OD2, OD3 and OD4, selected based on the determination result, to the second circuit unit 13 as the output data OD.

Upon receiving a fault detection signal, the controller 14 reads contents of the register 24A and controls the second circuit unit 13 based on the contents of the register 24A.

Alternatively, the detection signal DS may, in addition to the detection of non-coincidence, include information indicating the details of coincidence and non-coincidence. In such a case, because the controller 14 is capable of knowing the details of the determination result without accessing the register 24A, the determination block 24 need not include the register 24A.

1.1.2. Time-Multiplexed Processing Block

Figure 3:
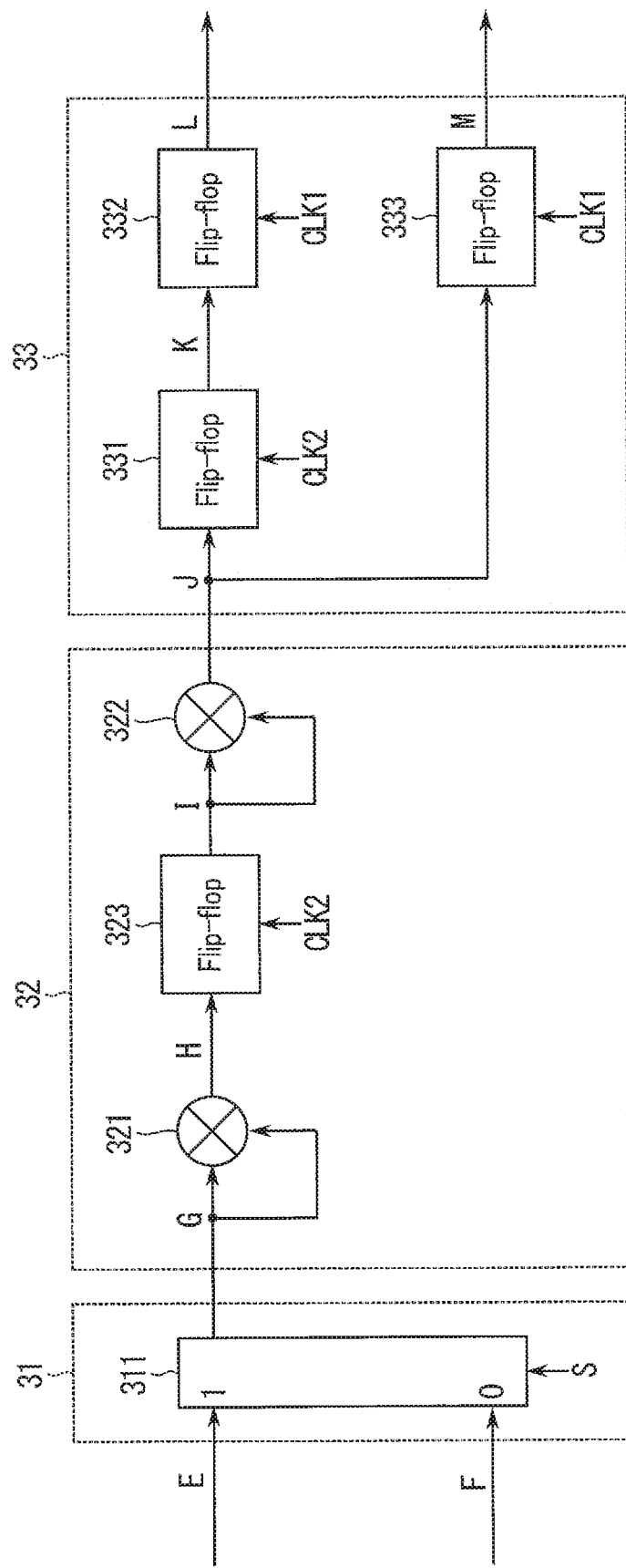
FIG. 3 illustrates an example of details of time-multiplexed processing blocks according to the first embodiment.

FIG. 3 illustrates an example of details of a time-multiplexed processing block 23 according to the first embodiment. FIG. 3 is based on an example in which the processing p is calculation of the fourth power of an input value, and shows an example in which the data processing block 32 has a configuration for the fourth power calculation. The details of the data processing block 32 are not limited to the example in FIG. 3, rather, the data processing block 32 includes components and couplings that are determined based on the details of the processing p.

As illustrated in FIG. 3, the PS conversion block 31 includes a selector 311. The selector 311 includes a first input and a second input, and is coupled to a node E at the first input and to a node F at the second input. The selector 311 selects the node E or node F based on the control signal S, and couples the selected node E or F to its own output node, that is, the node G. As an example, the selector 311 selects the node E while the control signal S indicates data "1" (high level) and selects the node F while the control signal S indicates data "0" (low level).

The data processing block 32 includes multiplier circuits 321 and 322 and a flip-flop circuit 323. The node G is coupled to a first input and a second input of the multiplier circuit 321. The multiplier circuit 321 multiplies data received by the first input and data received by the second input, and outputs the multiplication result at a node H.

The node H is coupled to the input of the flip-flop circuit 323. The flip-flop circuit 323 receives the clock CLK2 and outputs data that has been received as an input to a node I in the order in which the data has been received in synchronization with the clock CLK2.

The node I is coupled to the first and second inputs of the multiplier circuit 322. The multiplier circuit 322 multiplies data received by the first input and data received by the second input, and outputs the multiplication result at a node J.

The SP conversion block 33 includes flip-flop circuits 331, 332, and 333. The flip-flop circuit 331 is coupled, at the input thereof, to the node J. The flip-flop circuit 331 receives the clock CLK2 and outputs data that has been received at the input thereof to a node K in the order in which the data has been received in synchronization with the clock CLK2.

The flip-flop circuit 332 is coupled, at the input thereof, to the node K. The flip-flop circuit 332 receives the clock CLK1 and outputs data that has been received at the input thereof to a node L in the order in which the data has been received in synchronization with the clock CLK1.

The flip-flop circuit 333 is coupled, at the input thereof, to the node J. The flip-flop circuit 333 receives the clock CLK1 and outputs data that has been received at the input thereof to a node M in the order in which the data has been received in synchronization with the clock CLK1.

1.2. Operation

<1.2.1. Operation of Time-Multiplexed Processing Block>

Figure 4:
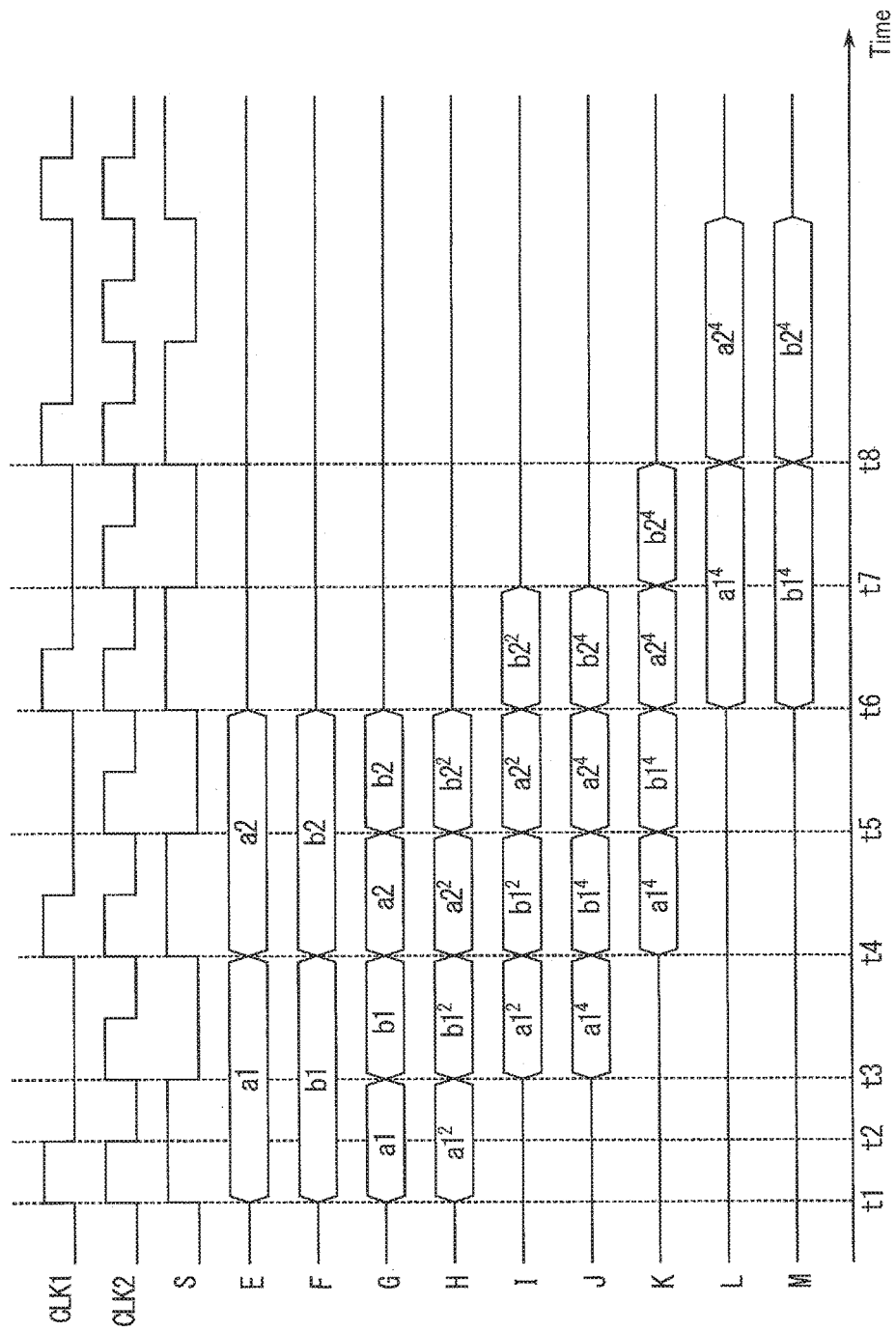
FIG. 4 illustrates, over time, signals at several nodes of the time-multiplexed processing block and related signals according to the first embodiment.

FIG. 4 illustrates, over time, signals at several nodes of the time-multiplexed processing block 23 and related signals according to the first embodiment.

As illustrated in FIG. 4, the clock CLK1 holds a high level for an initial quarter period of one cycle and holds a low level for the remaining three-quarter period. In the example of FIG. 4, one cycle of the clock CLK1 extends from time t1 to time t4, and the clock CLK1 holds a high level from time t1 to time t2 and holds a low level from time t2 to time t4. The period from time t1 to time t2 and the period from time t2 to time t3 are each half the period from time t1 to time t3. The period from time t3 to time t4 and the period from time t1 to time t3 have the same length.

The clock CLK2 has half the cycle of the clock CLK1 and holds a high level for an initial half cycle and holds a low level for the remaining cycle. In the example of FIG. 4, the cycle of clock CLK2 extends from time t1 to time t3, and the clock CLK2 has an inverted logic at time t2. The clock CLK2 rises with the same timing as the rising edge of the clock CLK1.

The control signal S has the same cycle as the clock CLK1 and holds a high level for an initial half cycle and holds a low level for the remaining cycle. That is, the control signal S holds a high level from time t1 to time t3 and holds a low level from time t3 to time t4. The control signal S rises with the same timing as the respective rising edges of the clocks CLK1 and CLK2.

As an example, an input data ID includes consecutive data a1 and data a2. The input data ID(ID1) received by the first input I11 is referred to as data a1 and data a2, and the input data ID(ID2) received by the second input I12 is referred to as data b1 and data b2. The data a1 is the same as the data b1, and the data a2 is the same as the data b2.

From time t1 to t4, the data a1 flows at node E and the data b1 flows at node F. The control signal S comes to have a high level at time t1 and, accordingly, the data a1 is selected by the selector 311 from time t1, and the data a1 is output at node G from time t1. From time t1, the data a1 is received by the multiplier circuit 321, and data $a1^2$, which has a value of the square of the data a1, is output at node H. The data $a1^2$ is latched by the flip-flop circuit 323.

At time t3, the control signal S comes to have a low level. As a result, from time t3, the data b1 is output at node G, and data $b1^2$, which has a value of the square of the data b1, is output at node H. The data $b1^2$ is latched by the flip-flop circuit 323.

At time t3, the clock CLK2 comes to have a high level. In response to this change, the flip-flop circuit 323 outputs, at the node I, the data held at time t2, that is, the data $a1^2$. The multiplier circuit 322 receives the data $a1^2$ at node I and outputs data $a1^4$, which has a value of the square of the data $a1^2$, at node J. The data $a1^4$ is latched by both the flip-flop circuits 331 and 333.

From time t4 to t6, the data a2 flows at node E and the data b2 flows at node F. The control signal S comes to have a high level at time t4 and, accordingly, the data a2 is selected by the selector 311 from time t4, and the data a2 is output at node G from time t4. From time t4, the data a2 is received by the multiplier circuit 321, and data $a2^2$, which has a value of the square of the data a2, is output at node H. The data $a2^2$ is latched by the flip-flop circuit 323.

At time t4, the clock CLK2 comes to have a high level. In response to this change, the flip-flop circuit 323 outputs, at the node I, the data held at time t4, that is, the data $b1^2$. The multiplier circuit 322 receives the data $b1^2$ at node I and outputs data $b1^4$, which has a value of the square of the data $b1^2$, at node J. The data $b1^4$ is latched by both the flip-flop circuits 331 and 333.

In response to the clock CLK2 coming to have a high level at time t4, the flip-flop circuit 331 outputs the data held at time t4, that is, the data $a1^4$, at node K. The data $a1^4$ is latched by the flip-flop circuit 332.

At time t5, the control signal S comes to have a low level. As a result, from time t5, the data b2 is output at node G, and data $b2^2$, which has a value of the square of the data b2, is output at node H. The data $b2^2$ is latched by the flip-flop circuit 323.

At time t5, the clock CLK2 comes to have a high level. In response the change, the flip-flop circuit 323 outputs, at the node I, the data held at time t5, that is, the data $a2^2$. The multiplier circuit 322 receives the data $a2^2$ at node I and outputs data $a2^4$, which has a value of the square of the data $a2^2$, at node J. The data $a2^4$ is latched by both the flip-flop circuits 331 and 333.

In response to the clock CLK2 coming to have a high level at time t5, the flip-flop circuit 331 outputs the data held at time t5, that is, the data $b1^4$, at node K. The data $b1^4$ is latched by the flip-flop circuit 332.

At time t6, the clock CLK2 comes to have a high level. In response to the change, the flip-flop circuit 323 outputs, at the node I, the data held at time t6, that is, the data $b2^2$. The multiplier circuit 322 receives the data $b2^2$ at node I and outputs data $b2^4$, which has a value of the square of the data $b2^2$, at node J. The data $b2^4$ is latched by both the flip-flop circuits 331 and 333.

In response to the clock CLK2 coming to have a high level at time t6, the flip-flop circuit 331 outputs the data held at time t6, that is, the data $a2^4$, at node K. The data $a2^4$ is latched by the flip-flop circuit 332.

At time t6, the clock CLK1 shifts comes to have a high level. In response to the change, the flip-flop circuit 332 outputs, at the node L, the data held at time t6, that is, the data $a1^4$. In addition, in response to the clock CLK1 coming to have a high level at time t6, the flip-flop circuit 333 outputs, at node M, the data that held at time t6, that is, the data $b1^4$.

At time t7, in response to the clock CLK2 coming to have a high level, the flip-flop circuit 331 outputs the data held at time t7, that is, the data $b2^4$, at node K. The data $b2^4$ is latched by the flip-flop circuit 332.

At time t8, the clock CLK1 comes to have a high level. In response to the change, the flip-flop circuit 332 outputs, at the node L, the data held at time t8, that is, the data $a2^4$. In addition, in response to the clock CLK1 coming to have a high level at time t8, the flip-flop circuit 333 outputs, at node M, the data that is held at time t8, that is, the data $b2^4$.

Thus, when the data a1 and data b1 are supplied from time t1 to time t3, the data $a1^4$ and data $b1^4$ are output in parallel from time t6 to time t8, and when the data a2 and data b2 are supplied from time t4 to time t6, the data $a2^4$ and data $b2^4$ are output in parallel from time t8 to time t10.

The data $a1^4$ and data $b1^4$ are the same data and the data $a2^4$ and data $b2^4$ are the same data, only when the data processing block 32 is operating normally.

<1.2.2. Operation of Determination Block and Control Block>

Figure 5:
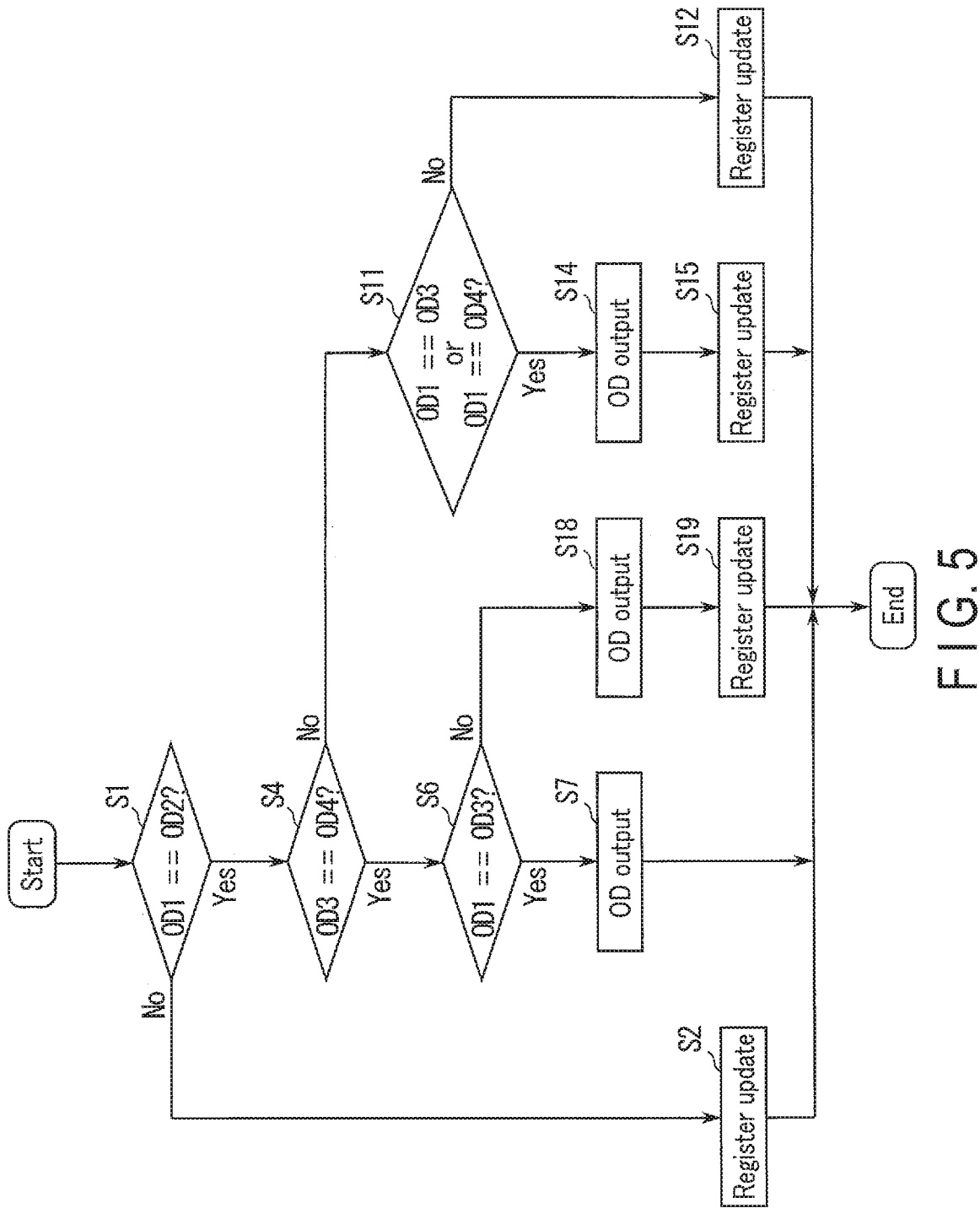
FIG. 5 illustrates a flow of operation of a determination block and a controller according to the first embodiment.

FIG. 5 illustrates a flow of operation of the determination block 24 and the controller 14 according to the first embodiment.

In step S1, the determination block 24 determines whether or not the data OD1 and data OD2 are the same. When the data OD1 and data OD2 are different (No branch), the determination block 24 outputs, in step S2, the detection signal DS indicating that a fault has occurred. When the determination of step S1 is No, it cannot be determined which of the data OD1 and OD2 is correct, that is, which of the data OD1 and OD2 is the data obtained as a result of the input data ID undergoing the processing p. Therefore, the determination block 24 does not output output data, for example.

In step S2, the determination block 24 updates the value in the register 24A with a value indicating that the data OD1 and OD2 do not coincide with each other. Thereafter, the processing ends.

When the determination in step S1 is Yes, the determination block 24 determines in step S4 whether or not the data OD3 and OD4 are the same. When the data OD3 and OD4 are the same (Yes branch), the determination block 24 determines in step S6 whether or not the data OD1 and OD3 are the same. In step S6, OD2 may be used instead of the data OD1 and/or data OD4 may be used instead of the data OD3. This is because, in step S6, the data OD1 is the same as the data OD2 and the data OD3 is the same as the data OD4. In step S7, the determination block 24 outputs any one of the data OD1, OD2, OD3, and OD4 as the data OD, and the processing ends.

In step S4, when the data OD3 does not coincide with the data OD4 (No branch), the processing goes to step S11. In step S11, the determination block 24 determines whether either a condition that the data OD1 coincides with the data OD3 or a condition that the data OD1 coincides with the data OD4 is satisfied. When the determination of step S11 is No, this indicates an anomalous state. The anomalous state includes a fault of the determination block 24. The No branch of step S11 continues to step S12. In step S12, the determination block 24 outputs a fault detection signal and sets, in the register 24A, a value indicating the anomalous state. Thereafter, the processing ends. In step S11, the data OD2 may also be used in place of the data OD1.

In step S11, when the data OD1 coincides with the data OD3 or OD4 (Yes branch), the processing goes to step S14. In step 814, the determination block 24 outputs any of the data OD1 and OD2. In step S15, the determination block 24 sets, in the register 24A, a value indicating a temporary fault and outputs a fault detection signal. Thereafter, the processing ends. Steps S14 and S15 may also occur in the reverse order.

In step S6, when the data OD1 differs from the data OD3 (No branch), the processing goes to step S18. In step S18, the determination block 24 outputs any of the data OD1 and OD2. In step S19, the determination block 24 sets, in the register 24A, a value indicating aged deterioration and outputs a fault detection signal. Thereafter, the processing ends. Steps S18 and S19 may also occur in the reverse order.

FIG. 6 illustrates the input data ID and the data OD1, OD2, OD3, and OD4 when the determination in step S6 of FIG. 5 is No. The input data ID is data DT, and the data that is obtained by subjecting the input data DT to the processing p is data PDT.

In the case of FIG. 6, the data OD1 and data OD2 are the data PDT. Meanwhile, the data OD3 and OD4 are both data EDT, which is different from the data PDT. In this case, the processing for generating the data OD3 and the processing for generating the data OD4 both generate erroneous data EDT. This fact indicates that the data processing block 32 always performs erroneous processing. This phenomenon can arise when the data processing block 32 has deteriorated through aging. This is because the input data ID is processed two times by the data processing block 32 and the same erroneous data EDT is generated in the respective processing.

The data processing blocks 21, 22 and 32 include the same structure and operate in parallel, and therefore can likewise be regarded as having undergone aged deterioration. Aged deterioration frequently occurs as a signal delay in each of the data processing blocks 21, 22 and 32. The data processing block 32 operates at a higher speed than the data processing blocks 21 and 22, and therefore its operational timing margin is smaller than the operational timing margins of the data processing blocks 21 and 22. Accordingly, when the data processing blocks 21, 22 and 32 has deteriorated through aging, sometimes correct data PDT is not obtained via the path of the data processing block 32 even when correct data PDT is obtained via the paths of the data processing blocks 21 and 22. Although correct data PDT is obtained by the data processing blocks 21 and 22 based on a normal speed (that is, using clock CLK1), the data processing blocks 21, 22 and 32 has deteriorated though aging, and in the near future there is a possibility of correct data no longer being obtained by the data processing blocks 21 and 22 at a normal speed. By predetecting the aged deterioration of the data processing block 32 as a result of using data via the data processing block 32, measures can be taken against the aged deterioration of the data processing blocks 21, 22 and 32 before the data processing unit 12 malfunctions.

FIG. 7 illustrates the input data ID and the data OD1, data OD2, data OD3, and data OD4 when the determination in step S11 of FIG. 5 is No. In the case of FIG. 7, the data OD1 and data OD2 are the data PDT. Meanwhile, one of the data OD3 and OD4 is the data PDT, but the other is the data EDT, which is different from the data PDT. In FIG. 7, the data OD3 is the data EDT by way of example. The following description is based on this example. In this case, although the data OD3 and OD4 are different, one of the data OD3 and OD4 (the data OD4) is the same as the data OD1 and OD2. This can be regarded to indicate that the data processing block 32, and therefore the data processing blocks 21, 22 and 32 has not yet badly deteriorated through aging and that failure of obtaining correct data OD3 can be attributed to a temporary effect, such as noise. Based on such deduction, the case in FIG. 7 can be determined as being a temporary fault.

In the case of FIG. 7, after having received a fault detection signal, the controller 14 learns, from the value in the register 24A, that there is a temporary fault and that there is not necessarily a subsequent need to take some kind of countermeasure.

When a fault detection signal is generated in states other than those of the cases of FIGS. 6 and 7, this indicates that the data processing unit 12 has some kind of anomaly that is neither due to the aged deterioration of the data processing blocks 21, 22 and 32 nor a temporary fault. Such states are recognized by the controller 14 by reading the value in the register 24A, and, based on this recognition, the controller 14 is able to perform additional processing. Such a kind of processing can include, for example, stopping the operation of a block that controls the whole system of the integrated circuit device 1 or a block downstream of the data processing unit 12 such as the second circuit unit 13, for example.

1.3. Advantages

According to the first embodiment, an integrated circuit device enabling a fault state to be detected in more detail can be provided. The details are as follows.

Figure 8:
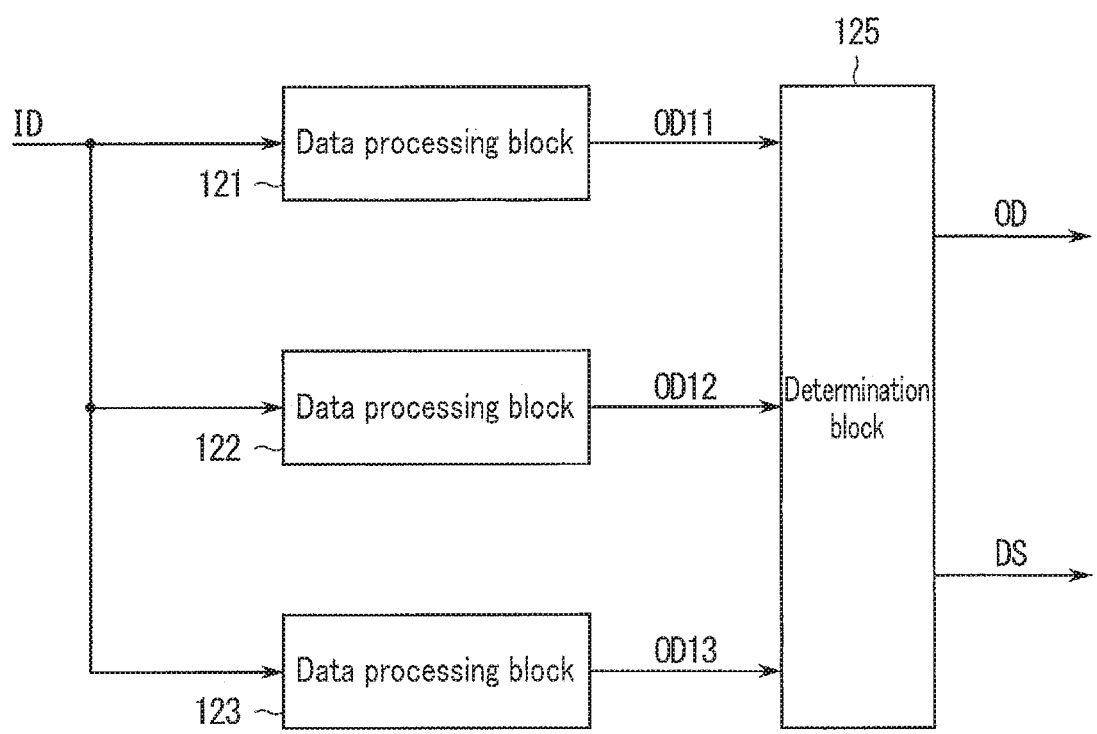
FIG. 8 illustrates functional blocks of a data processing unit for reference.

A data processing circuit of the kind in FIG. 8 that includes a functional safety mechanism is known. This data processing circuit includes three data processing blocks 121, 122 and 123 which perform particular processing p to respectively output data OD11, OD12 and OD13 to the determination block 125. The determination block 125 compares the output data OD11, OD12, and OD13, and when any one of the output data OD11, OD12, and OD13 (data OD13, for example) does not coincide with the remaining two output data (OD11 and OD12, for example), the determination block 125 outputs either of the two coinciding data as the output data OD. Even when the data processing block 123 has a fault, the processing p which is to be performed can be performed by the remaining data processing blocks 121 and 122, and data that is considered to be correct can be selected by means of a majority decision.

However, the determination block 125 is limited to being able to detect the fact that an anomaly occurs in any one of the data processing blocks 121, 122 and 123, and is unable to specify the cause of the anomaly. In addition, when the data processing blocks 121, 122 and 123 have deteriorating though aging, the data OD11, OD12 and OD13 coincide with each other despite being erroneous, and therefore the determination block 125 determines that the data processing blocks 121, 122 and 123 are operating normally. This does not enable functional safety of the data processing circuit to be realized adequately, and there is room for improvement for a data processing circuit which includes a functional safety mechanism.

According to the first embodiment, the data processing unit 12 includes two data processing blocks 21 and 22 which receive common data ID and perform the processing p, and a time-multiplexed processing block 23 which includes the data processing block 32 which receives the data ID and performs the processing p. The time-multiplexed processing block 23 causes the data processing block 32 to operate at a higher speed than the data processing blocks 21 and 22 and performs the processing p on the data ID and the respective duplicates thereof. The data processing unit 12 then compares the output data OD1 of the data processing block 21, the output data OD2 of the data processing block 22, and the two output data OD3 and OD4 of the time-multiplexed processing block 23. As a result of this comparison, the determination block 24 can separately detect aged deterioration and a temporary fault of the data processing unit 12. Accordingly, an integrated circuit device 1 which includes the data processing unit 12 which has a higher-performance functional safety mechanism can be provided.

1.4. Modified Example

The description hereinabove is based on an example in which the time-multiplexed processing block 23 receives a total of two duplicates of the data ID, the clock CLK2 has a cycle which is two times the cycle of the clock CLK1, and the time-multiplexed processing block 23 outputs a total of two pieces of output data. The first embodiment is not limited to this example. The time-multiplexed processing block 23 can be configured to receive a total of N duplicates (where N is a natural number of 3 or more) of the data ID, to receive the clock CLK2 having a cycle which is an X multiple of the cycle of the clock CLK1, and to output a total of X output data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An integrated circuit device comprising:
   a first processing unit which receives a first clock and includes a first input node and a first output node, the first processing unit configured to output, at the first output node, data that is obtained by first processing of data at the first input node;
   a second processing unit which receives the first clock and includes a second input node and a second output node, the second processing unit being coupled to the first input node at the second input node and configured to output, at the second output node, data that is obtained by the first processing of data at the second input node;
   a third processing unit which receives a second clock of a shorter cycle than a cycle of the first clock and includes a third input node, a fourth input node, a third output node, and a fourth output node, the third processing unit being coupled to the first input node at the third input node and the fourth input node, configured to output, from the third output node, data that is obtained by the first processing of data at the third input node, and configured to output, at the fourth output node, data that is obtained by the first processing of data at the fourth input node; and
   a determination unit which includes a fifth input node coupled to the first output node, a sixth input node coupled to the second output node, a seventh input node coupled to the third output node, and an eighth input node coupled to the fourth output node, the determination unit being configured to output a first signal based on data at the fifth input node, data at the sixth input node, data at the seventh input node, and data at the eighth input node.

2. The device according to claim 1, wherein:
   the third processing unit processes the data at the third input node and the data at the fourth input node in different time periods.

3. The device according to claim 1, wherein:
   the third processing unit outputs, in parallel, the data that is obtained by the first processing on the data at the third input node and the data that is obtained by the first processing on the data at the fourth input node.

4. The device according to claim 1, wherein:
   the determination unit outputs the first signal when, in response to first data being input to the first input node, the determination unit receives the same data at the fifth input node and the sixth input node, receives different data at the seventh input node and the eighth input node, and receives different data at the fifth input node and the seventh input node or the fifth input node and the eighth input node.

5. The device according to claim 1, wherein:
   the determination unit outputs the first signal when, in response to second data being input to the first input node, the determination unit receives the same data at the fifth input node and the sixth input node, receives the same data at the seventh input node and the eighth input node, and receives different data at the fifth input node and the seventh input node.

6. The device according to claim 1, wherein:
   the determination unit outputs data at any of the fifth input node, the sixth input node, the seventh input node, and the eighth input node without outputting the first signal when, in response to third data being input to the first input node, the determination unit receives the same data at the fifth input node, the sixth input node, the seventh input node, and the eighth input node.

7. The device according to claim 1, wherein:
   the first processing unit performs the first processing on the data at the first input node,
   the second processing unit performs the first processing on the data at the second input node, and
   the third processing unit performs the first processing on the data at the third input node and performs the first processing on the data at the fourth input node.

8. The device according to claim 1, wherein:
   the third processing unit includes a fourth processing unit, and
   the first processing unit, the second processing unit, and the fourth processing unit include the same structure.

9. The device according to claim 8, wherein:
   the fourth processing unit receives the second clock.

10. The device according to claim 9, wherein:
    the third processing unit further includes a first converter and a second converter,
    the first converter includes the third input node and the fourth input node, and
    the second converter includes the third output node and the fourth output node.

11. The device according to claim 10, wherein:
    the first converter transmits, to the fourth processing unit, a first part of the first data at the third input node and transmits, to the fourth processing unit, a second part of the first data at the fourth input node.

12. The device according to claim 11, wherein:
    the second converter:
    receives, from the fourth processing unit, the data that is obtained by the first processing of the data at the third input node and then receives the data that is obtained by the first processing of the data at the fourth input node,
    is configured to output, in parallel, the data that is obtained by the first processing of the data at the third input node and the data that is obtained by the first processing of the data at the fourth input node.

* * * * *